March 22, 1955 F. G. STEELE 2,704,431

STABLE RESONANT CIRCUIT

Filed Jan. 17, 1949 2 Sheets-Sheet 1

INVENTOR.
FLOYD G. STEELE

BY Herbert E. Metcalf
Attorney

March 22, 1955 F. G. STEELE 2,704,431

STABLE RESONANT CIRCUIT

Filed Jan. 17, 1949 2 Sheets-Sheet 2

INVENTOR.
FLOYD G. STEELE
BY Herbert E. Metcalf
Attorney

United States Patent Office 2,704,431

Patented Mar. 22, 1955

2,704,431

STABLE RESONANT CIRCUIT

Floyd G. Steele, Long Beach, Calif., assignor to Northrop Aircraft, Inc., Hawthorne, Calif., a corporation of California Application January 17, 1949, Serial No. 71,327

1 Claim. (Cl. 58—24)

My invention relates to stable resonant circuits, and more particularly to a resonant circuit containing inductance and capacity wherein all conductive members of the circuit are maintained at or below the superconductive state of the conductors. This application is a continuation in part of my prior application, Serial No. 66,383, filed December 20, 1948 for a resonant circuit and accelerometer.

In my prior application cited above, I have shown, described and claimed a resonant circuit wherein the self-inductance of a ring or rings of electrons rotating in an orbital path in a superconductor is used in conjunction with a capacity to provide a resonant circuit whose stability with respect to acceleration forces can be stiffened or relaxed by variation of the geometry of the superconducting conductor. In order that the rundown time of the device can be made long, I also maintained the capacity elements and their connections to the conductor at a temperature where they also were superconductive, thereby providing a resonant circuit in which all the conductive elements are in the superconductive state. As the electron ring or rings have appreciable mass and can be displaced within the conductor in which the flow is circulating, by acceleration forces, the device can be used as an accurate accelerometer by measuring changes in frequency due to the change in self-inductance of the orbital electron flow.

The present invention differs from that of the above cited application in that in the present invention no orbital electron ring is present and the resonant circuit operates with only an oscillating current flowing in a superconductive LC circuit, this oscillating circuit being, in the absence of disturbing magnetic fields, entirely frictionless and therefore persistent, and insensitive to accelerations.

The stable resonant circuit of the present invention depends for its frictionless characteristics on the property known as superconductivity exhibited by certain metals and alloys at extremely low temperatures.

The state of zero electrical resistance in may metals and alloys, known as superconductivity, is due to the appearance at very low temperatures of electrons endowed with the remarkable property of being able to travel through certain materials without the slightest trace of electrical friction. Such properties have been extensively investigated in various laboratories at temperatures as low as on the order of 1° K., obtained by boiling liquid helium, for example, in a cryostat.

One material that has the superconductive property at and below about 15° K. is columbium nitride. As this temperature is some 50% higher than, on the absolute scale of temperature, any previously known superconductor, it can be made superconducting in the temperature range attainable with liquid hydrogen alone, i. e., without the necessity of using liquid helium. This simplification makes superconductivity available in a relatively light cryostat suitable for aircraft use for example, one that can be initially charged, for example, with liquid hydrogen and which will maintain a constant temperature of 14° K. for many hours.

Inasmuch as known means of measuring the frequency of periodic oscillations are perhaps the most accurate measuring instruments presently available, I prefer to utilize the principles of superconductivity to create a frictionless tuned circuit, in which periodic oscillatory currents can be maintained over long periods without other than initial energization. I preferably create an electron flow in a superconductor, and utilize self-inductance of the frictionless current in conjunction with a capacity to produce a tuned circuit. In order that the current may persist as long as superconductivity is present, I also make the capacity elements and the connections to the inductance of superconductive material also maintained at its superconductive temperature. I thus provide a tuned, periodic oscillation in a completely resistance free resonant circuit. Such a circuit is deemed to be novel and forms perhaps the most stable oscillation circuit yet to be developed. For that reason such a superconductive oscillating circuit is ideally adapted for use as an extremely accurate time reference, or clock, merely by providing the superconductive oscillating circuit with a frequency measuring means. Many extremely accurate frequency measuring means are well known in the art.

It is, therefore, an object of the present invention to provide an exceptionally stable oscillatory circuit.

At this point it should be pointed out that the stability of a superconductive tuned circuit, as formed in accordance with the present invention, is in no way due to temperature stabilization comparable to that previously obtained by the use of constant temperature ovens for example. It must be clearly understood that frequency stabilization in the device of the present invention is due to the absolutely resistance free condition of the entire circuit once the superconductive state is reached, variations of temperature below that at which superconductivity is attained do not affect circuit stability. For example, a columbium nitride circuit becomes superconductive below about 14.5° K., which is the temperature of boiling liquid hydrogen in its triple state. At the temperature of liquid helium, i. e., about 1.8° K., the conditions in a columbium nitride circuit are not measurably different than at 14° K. Thus, it is clear that the stability of the superconductive resonant circuit of the present invention is not due to temperature stabilization when the threshold superconductive temperature has once been reached.

These and other objects and advantages of the present invention will be more fully understood by reference to the ensuing description of the invention in a preferred form as shown in the drawings, in which.

As the present invention involves the maintenance of a circuit in a superconductive state, and as it is preferred to utilize the superconductive properties of columbium nitride at about 14° K. obtained by boiling liquid hydrogen, the invention will first be described in the form of a simple oscillating circuit held at superconductive temperature in a cryostat.

Figure 1:
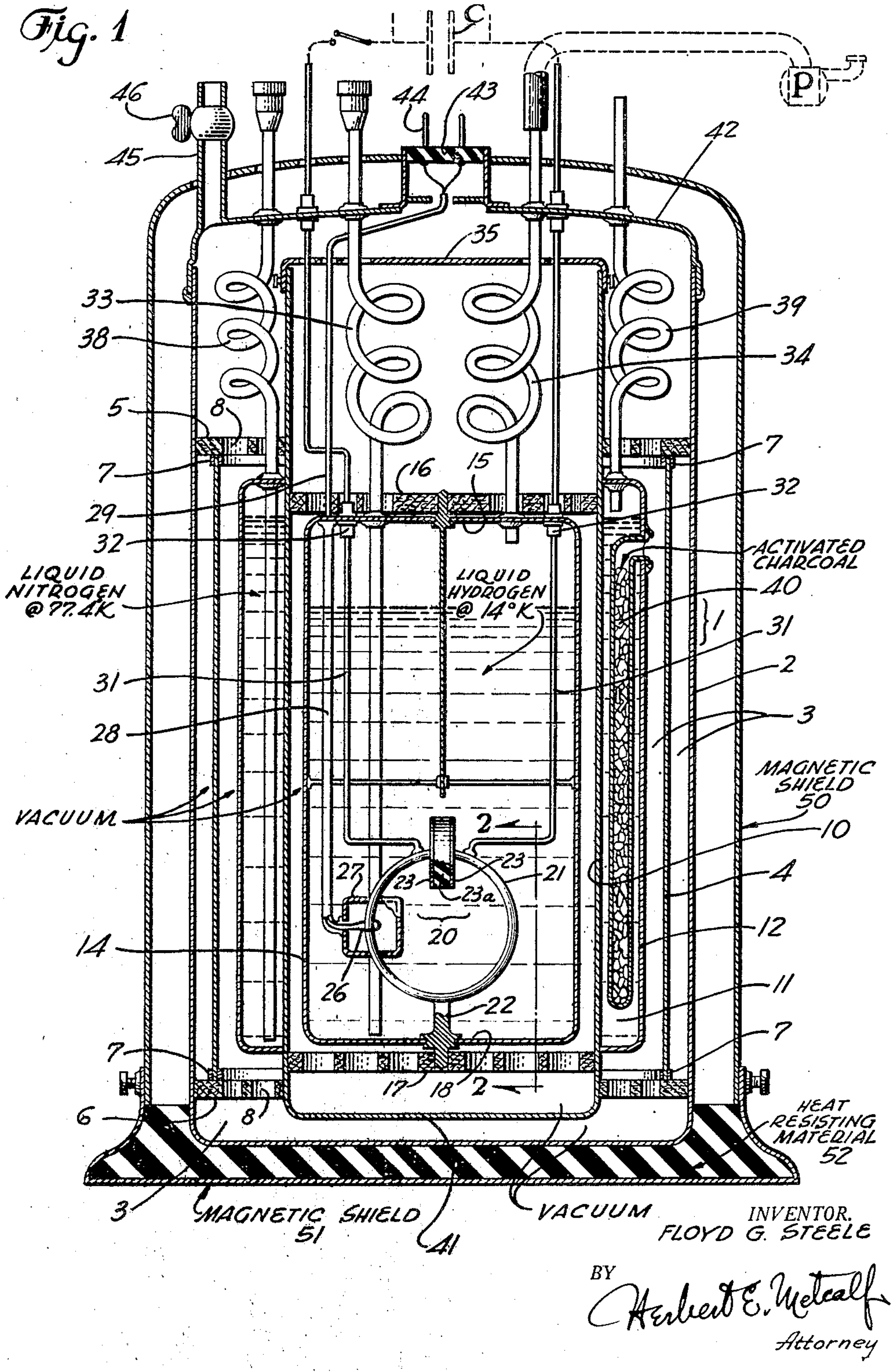
Figure 1 is a vertical sectional view, partly in elevation of a preferred form of cryostat utilized to obtain superconductivity in the device of the present invention, shown as containing a superconductive resonant circuit.
Figure 2:
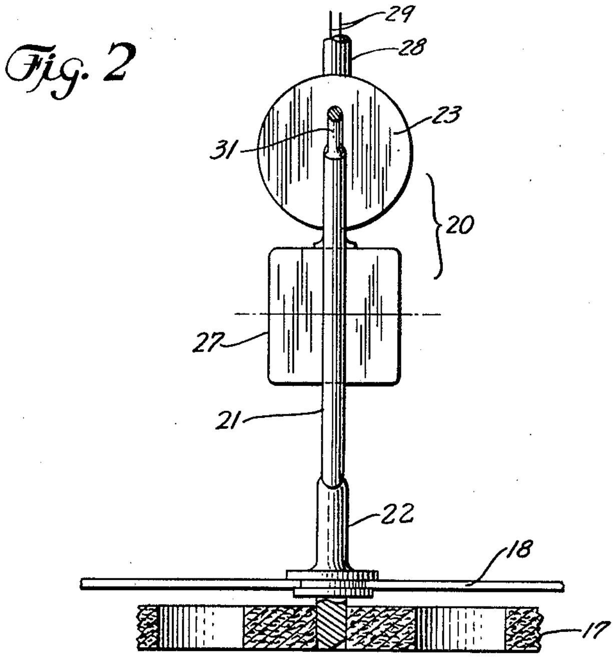
Figure 2 is a partial sectional view taken as indicated by the line 2—2 in Figure 1, certain elements being shown in elevation.

A preferred cryostat utilized to obtain superconductive temperatures in the practice of the present invention in its preferred forms is a modification of a liquid hydrogen cryostat developed for the U. S. Navy at Johns Hopkins University, Baltimore, Maryland, in 1947. This modified cryostat is shown in Figure 1 which will first be referred to.

The outside case of the cryostat 1 is a cylindrical shell 2 of Monel metal. This case provides the outer wall of a vacuum chamber 3 serving as thermal insulation for the elements inside, and also forms the principal mechanical support on which the other elements of the cryostat are suspended.

Within and concentric with the outside case there is a radiation shield 4 of polished aluminum. This shield is held in position by two thick annular "Masonite" rings 5 and 6, one press-fitted into each end of the shell 2. Inserted in the "Masonite" rings 5 and 6 are shoulders 7 which project to prevent the shield 2 from shifting transverse to the principal axis. The "Masonite" rings 5 and 6 insure thermal insulation between the outer case 2 and the shield 4.

In order to further increase the heat leak by conduction, the rings 5 and 6 have slots 8 cut in them, arranged in such a manner as to provide a long path for any heat flowing through, while at the same time retaining structural strength.

Extending through and fitting snugly inside the rings 5 and 6 there is a copper cylinder 10 which forms the inner wall of a liquid nitrogen vessel 11.

Around the outside of the central and lower portion of the copper cylinder 10 there is mounted an outer vessel wall 12 of copper, the ends of which are turned inwardly and sealed to copper cylinder 10, thus forming the vessel 11 for holding the liquid nitrogen.

A container 14 for liquid hydrogen is formed from Monel metal and is located inside the copper cylinder 10 which forms the inner wall of the liquid nitrogen vessel 11 but is spaced therefrom. The top 15 of the container 14 is held in place by an insulating disc 16 of "Masonite," extended inwardly from copper cylinder 10. A second "Masonite" disc 17 holds the bottom 18 of the hydrogen container 14 in position by a press-fit of the second disc 17 into the copper cylinder 10 of the nitrogen vessel 11. The type of slotting arrangement used in the "Masonite" discs 16 and 17 is the same as that used in the "Masonite" annular rings 5 and 6.

Inside the hydrogen container 14, near the bottom thereof there is located a resonant circuit 20.

This resonant circuit 20 comprises a columbium nitride inductance 21 supported by a copper end upright 22 attached to the bottom of hydrogen container 14. This inductance may be, for example, from one to six inches in diameter. A pair of spaced columbium nitride condenser plates 23 are connected at the end of a single inductance loop. The space between plates 23 is closed by an insulator block **23*a***.

The inductance 21 can be formed, for example, from columbium metal wire, presently available with an impurity specification of less than one percent. One method of preparing the inductance is to first wash it with carbon tetrachloride to remove any grease. A stream of ammonia, after passing through a mercury bubbler and a calcium chloride dryer, enters through the top of a tube to be used for nitriding the cylinder. The gas passes out of the bottom of the tube and goes through a calcium chloride dryer, a safety trap, and is finely bubbled into water. When the air has been completely flushed away from the interior of the tube, a current is passed through the wire sufficient to raise the temperature therein to the desired level, 1200°–1400° C., which is maintained for about 45 minutes or more. This gives a nitrided loop with the desired properties.

The condenser plates 23 may be similarly nitrided by inductive heating and then welded to the columbium inductance 21 and the junction heated in nitrogen by conduction with a current passed through the loop and plate attachments. It has been found that welds do not prevent superconductivity if the weld material is columbium, and is nitrided after welding.

Positioned around inductance loop 21 between one plate 23 and the other is a pickoff coil 26 enclosed in a casing and having a tube 28 extending to the top of the hydrogen container to carry the cable 29 from coil 26 outside of the container. Thus, coil 26, which may be of copper, is at liquid hydrogen temperature but not in contact with the liquid, and is not superconductive. In case the LC circuit 21—23 is small, the entire circuit can be placed within casing 27.

Also within the hydrogen container 14 are positioned leads 31 connected to inductance 21, one on each side of condenser 23—23. These leads are sealed through top 15 of the hydrogen container 14 by insulating seals 32.

The liquid hydrogen container 14 is filled through a hydrogen filler tube 33 coiled above "Masonite" disc 16. Filler tube 33 is made of supernickel and is sealed through top 15 and extends to the bottom of hydrogen container 14. There is also a similarly coiled hydrogen gas vent tube 34 also made of supernickel sealed to top 15. This vent tube 34 also provides a convenient means of pumping down the liquid hydrogen to the triple point temperature, as will be described later.

The upper end of the copper cylinder 10 is then closed by a copper cap 35 through which hydrogen filler tube 33, vent tube 34 and leads 31 pass, as does cable 29 from coil 26. These passages, however, are not sealed. As cap 35 is held close to liquid nitrogen temperature, it acts as a top thermal shield for the hydrogen container.

The nitrogen vessel 11 is filled through a coiled nitrogen filler tube 38 extending to the bottom of nitrogen vessel 11, and also has a nitrogen coiled gas vent tube 39. Both tubes 38 and 39 extend upwardly to terminate outside the cryostat.

The nitrogen vessel 11 also contains two inset tubular traps 40 filled with activated charcoal, each tube being in connection with vacuum chamber 3.

The region around the bottom of the hydrogen container 14 is protected by a thermal shield 41 formed as an extension of the copper cylinder 10 that is the inner wall of the liquid nitrogen vessel. At the liquid nitrogen temperature the shield gives off negligible radiation to any object inside of it, while at the same time it cuts off and absorbs radiated heat or conducted heat from the outside. Outside this shield there is a continuation of the vacuum chamber 3. Thus, the thermal shielding of the bottom of the hydrogen container is similar to that obtained at the top thereof where the upper portion of copper cylinder 10 and cap 35 act in the same manner as the thermal shield 41.

The outer Monel shell 2 is then closed and sealed by an upper Monel cap 42 through which the leads 31, the hydrogen filler tube 33 and hydrogen vent pipe 34 pass, as well as the nitrogen filler tube 38 and nitrogen vent tube 39 also pass, the tubes being sealed to cap 42 as by welding, for example, the leads 31 being insulated by ceramic seals. Cable 29 is connected to a hermetic connection plug 43, the outside prongs 44 of which serve to make connections to the coil 26. The Monel cap 42 is also provided with a vacuum connection 45 by which the open spaces of the cryostat can be evacuated.

These vacuum spaces, in the construction above described, exist completely around the nitrogen vessel 11 and also completely around the hydrogen container 14.

In the use of the device, a preliminary pumping is made of the vacuum spaces in the cryostat by means of a vacuum pump (not shown) attached to vacuum connection 45. In practice this preliminary pumping is used to reduce the pressure to slightly below one-tenth of a millimeter of mercury. The vacuum connection is then sealed off by a vacuum valve 46.

The liquid nitrogen vessel 11 is then filled through nitrogen filler tube 38 and this tube is capped. The nitrogen vent tube 39 is left open so that the nitrogen will remain at its boiling point at one atmosphere, i. e., 77.4° K. If and when the cryostat is to be used at high altitudes, known pressure regulating means can be utilized to maintain the constant desired pressure of one atmosphere on the liquid nitrogen.

The liquid hydrogen is then introduced through the liquid hydrogen filler tube 33 and the filler tube is capped.

A small vacuum pump P (indicated in Figure 1 by dotted lines) is then attached to the hydrogen vent pipe 34, and the hydrogen is boiled under reduced pressure until the triple state is reached with the hydrogen partly liquid and partly solid at a temperature of about 14° K. This state is maintained by proper pressure regulation at the vacuum pump.

In subsequent operation, the charcoal traps 40 absorb the greater part of any residual air in the vacuum spaces, and the rest is frozen out on the liquid hydrogen container, so that an excellent vacuum is maintained at all times around the hydrogen and nitrogen containers.

At about 14.5° K. the entire resonant circuit of columbium nitride becomes superconductive.

Leads 31 are energized by a strong pulse from a static charge source C (shown in dotted lines) to charge capacity 23—23. A persistent and frictionless oscillating current then flows in the superconductive circuit as long as it is maintained in its state of superconductivity and is not influenced by an external magnetic field. For this latter reason, a magnetic shield 50 is placed around the entire cryostat to shield the circulating current from the earth's field, this magnetic shield mating with a base 51 also of magnetic material enclosing heat insulating material 52 on which the cryostat is supported.

The cryostat above described will maintain the hydrogen at the triple point for many hours with the resonant circuit in a superconductive state. Approximately 20 liters of liquid hydrogen are required for this purpose.

together with about 14 liters of liquid nitrogen when a six inch loop is used. With smaller loops a minimum of 5 liters of liquid hydrogen will last for 50 hours. Units of the type described have been subjected to severe mechanical strain, have stood up well under rugged treatment in the field and are thus ideally suitable for installation in aircraft.

The inductance of the superconductive loop is constant. This self-inductance, when combined with the superconductive capacity forms an exceptionally stable resonant circuit. Oscillations are started in the LC circuit by the initial charging of the capacity 23—23 and will persist until attenuated by energy pick-up loss only. No perturbations due to acceleration will be present, as no complete ring of electrons exists in the circuit.

Figure 3:
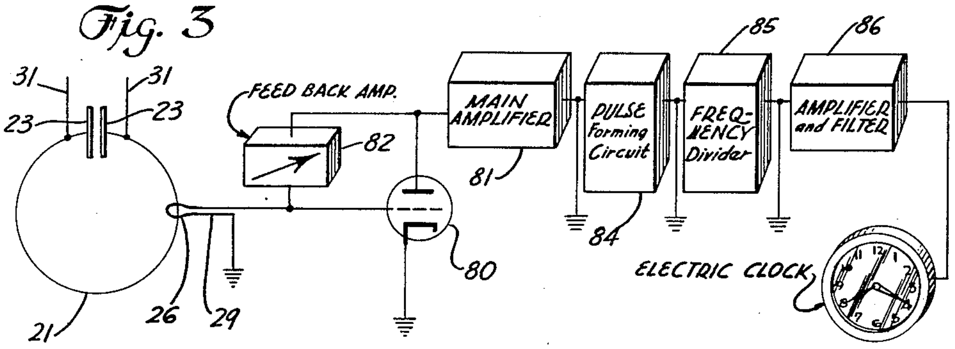
Figure 3 is a diagram of a clock circuit embodying the present invention.

As shown in Figure 3, the output from the inductance 21 and capacity 23—23 is taken from coil 26 and led to the grid of a high impedence input tube 80, the output of which energizes a main amplifier 81 and a feed-back amplifier 82, the output of the latter being variable, and fed back to coil 26 to reduce the energy pickup loss from the circulating current in the superconductive inductance 21. In this manner, energy losses from the superconductive circuit can be still further reduced. The main amplifier 81 feeds into a pulse forming circuit 84, which in turn feeds a frequency divider 85 in which the high frequency of LC circuit 21—23 is reduced by division to a low frequency that can be handled by synchronous electric motor. This low frequency is then amplified and filtered in filter amplifier 86 and used to drive an electric clock 87. For space navigation use, the clock may be dispensed with, and the pulsed output of the amplifier 86 may be used as a time base supplying counters, computers, or other navigational instruments, as may be desired.

The size of the superconducting inductances in the superconductive resonant circuit is not critical and can be varied from ½-inch to 6 inches in diameter, for example, and from a single loop to a coil 12 inches in length or more, depending upon the frequency desired. In some instances, weight of the cryostat and contents will dictate the size of the resonant circuit to be used. Small inductances are advantageous to save weight and cost of the cryostat and contents. Thus, I do not desire to be limited as to size, shape, or position of the inductances providing they comply with the principles of operation outlined herein.

While the present invention has been described herein as preferably utilizing the superconducting characteristics of columbium nitride at 14° K., as obtained by the use of evaporating liquid hydrogen, it is to be distinctly understood that many other electrical conductors become superconducting at still lower temperatures, such as temperatures that can be obtained by the use of evaporating liquid helium as a coolant. Such other superconducting materials are fully as suitable for use to produce the electron accelerometer of the present invention as is the columbium nitride circuits described herein. However, columbium nitride is more suitable for use in portable and transportable accelerometers, due to the higher temperature operation and greater availability of liquid hydrogen, and is preferred for such use. As the action of the device of the present invention is identical in any superconducting medium, whatever the temperature required to produce the superconducting state, I do not desire to be limited to the use of columbium nitride or to the use of liquid hydrogen in the practice of my invention, as other superconducting materials are full equivalents, irrespective of the temperature at which superconductivity takes place.

Furthermore, I do not desire to be limited in any way to the particular manner herein described of forming the columbium nitride circuits, or to the particular nitriding process herein described as illustrative. Published data is available on the fashioning of columbium bodies by the use of powder metallurgy and plating, together with satisfactory methods of nitriding such bodies. When lower temperatures are utilized, easily worked metals are available for the formation of the superconductive circuit without additional treatment.

From the above description and discussion it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the patent statutes, the invention has been described in language more or less specific as to structural features, it is to be understood that the invention is not limited to the specific features shown, but that the means and construction herein disclosed comprise the preferred form of one mode of putting the invention into effect, and the invention is therefore claimed in any of its possible forms or modifications within the legitimate and valid scope of the appended claim.

What is claimed is:

A stable resonant circuit which comprises an open-ended inductance of columbium nitride, a columbium nitride condenser plate attached to each end of said inductance, said plates being opposed to provide a capacity therebetween, means for maintaining said inductance and capacity in the superconductive state, means for charging said capacity to start persistent oscillations in said circuit, a coil positioned to intersect the field of said inductance, an amplifier energized by the pickup of said coil, a frequency indicator energized by said amplifier, means for feeding back a portion of the output of said amplifier into said coil, a frequency divider fed by the remaining portion of the output of said amplifier, and a clock mechanism operated by the output of said frequency divider.

References Cited in the file of this patent

UNITED STATES PATENTS

| | | |
|---|---|---|
| 685,012 | Tesla | Oct. 22, 1901 |
| 1,514,751 | Wold | Nov. 11, 1924 |
| 1,928,794 | Poole | Oct. 3, 1933 |
| 2,087,003 | Miller, Jr. | July 13, 1937 |
| 2,199,045 | Dallenbach | Apr. 30, 1940 |
| 2,422,386 | Anderson | June 17, 1947 |
| 2,435,423 | Clapp | Feb. 3, 1948 |

FOREIGN PATENTS

| | | |
|---|---|---|
| 516,554 | Germany | Apr. 3, 1933 |

OTHER REFERENCES

General Electric Review, June 1946, pages 19–25, "Superconductivity," by Hewlett.